(12) United States Patent
Takahashi et al.

(10) Patent No.: US 8,453,453 B2
(45) Date of Patent: Jun. 4, 2013

(54) HEAT PUMP

(75) Inventors: Yasuo Takahashi, Mito (JP); Takanori Shibata, Hitachinaka (JP); Hidefumi Araki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 12/942,049

(22) Filed: Nov. 9, 2010

(65) Prior Publication Data

US 2011/0048043 A1    Mar. 3, 2011

Related U.S. Application Data

(62) Division of application No. 11/840,544, filed on Aug. 17, 2007.

(30) Foreign Application Priority Data

Aug. 31, 2006  (JP) .................. 2006-235868

(51) Int. Cl.
*F01K 7/00*    (2006.01)
(52) U.S. Cl.
USPC .................. 60/670; 62/331; 60/645
(58) Field of Classification Search
USPC ............ 62/331; 236/15 BR; 60/645, 670
See application file for complete search history.

(56) References Cited

U.S. PATENT DOCUMENTS

| | | | |
|---|---|---|---|
| 3,493,167 A * | 2/1970 | Wake et al. | 417/22 |
| 3,744,264 A | 7/1973 | Ware | |
| 4,171,619 A | 10/1979 | Clark | |
| 4,288,198 A * | 9/1981 | Hibino et al. | 415/1 |
| 4,313,305 A | 2/1982 | Egosi | |
| 4,570,443 A | 2/1986 | Specht | |
| 6,311,506 B1 * | 11/2001 | Takahashi et al. | 62/196.4 |
| 2006/0130482 A1 * | 6/2006 | Chino et al. | 60/670 |
| 2007/0000267 A1 | 1/2007 | Shibata | |

FOREIGN PATENT DOCUMENTS

| | | |
|---|---|---|
| EP | 0 099 847 | 2/1984 |
| JP | 9-79180 A | 3/1997 |
| JP | 2001-153545 | 6/2001 |
| JP | 2002-195508 | 7/2002 |
| JP | 2005-134070 | 5/2005 |
| JP | 2006-010253 | 1/2006 |
| JP | 2007-010243 | 1/2007 |

OTHER PUBLICATIONS

JP 09079180 Harada (English Abstract).*

* cited by examiner

*Primary Examiner* — Cheryl J Tyler
*Assistant Examiner* — Jonathan Bradford
(74) *Attorney, Agent, or Firm* — Mattingly & Malur, PC

(57) ABSTRACT

A heat pump includes an evaporator 10 evaporating water; a steam compressor 1 compressing the vapor generated by the evaporator 10; a vapor supply duct 31 adapted to supply the vapor 30 compressed by the compressor 1 to steam-utilizing facility 2; a measuring device 91 for measuring a state of vapor between the evaporator 10 and the compressor 1; and a valve 81 adjusting an amount of vapor flowing in the compressor 1 based on information from the measuring device 91.

5 Claims, 8 Drawing Sheets

HEAT PUMP

This is a divisional application of U.S. application Ser. No. 11/840,544, filed Aug. 17, 2007, which claims priority to JP 2006-235868, filed Aug. 31, 2006, the contents of which are hereby incorporated by reference into this application.

BACKGROUND OF THE INVENTION

1. Field of the Invention

The present invention relates to a heat pump for supplying vapor.

2. Description of the Related Art

Operation control for a steam generator or boiler is performed when steam is supplied to factories or the like. JP-A-2002-195508 discloses such operation control, i.e., a technique for controlling steam pressure and steam flow through burn control of the boiler and a technique for maintaining a boiler water level at a set value through feed pump control.

SUMMARY OF THE INVENTION

In a case where a heat pump provided with a steam compressor is used to feed steam to factories, etc., control has not sufficiently been studied for dealing with variations in production of steam or a working medium resulting from temperature fluctuations of the heat source of the heat pump.

It is an object of the present invention is to provide a high-reliable heat pump that enables control for dealing with variations in steam production resulting from temperature fluctuations of exhaust heat which is a heat source.

To achieve the above object, there is provided a heat pump including: an evaporator evaporating water; a steam compressor compressing the vapor generated by the evaporator; a vapor supply duct adapted to supply the vapor compressed by the steam compressor to a steam-utilizing facility; and means for adjusting an amount of vapor flowing in the compressor.

The present invention can provide a high-reliable heat pump that enables control for dealing with variations in vapor production resulting from temperature fluctuation of exhaust heat which is a heat source.

DETAILED DESCRIPTION OF THE PREFERRED EMBODIMENTS

Figure 1:
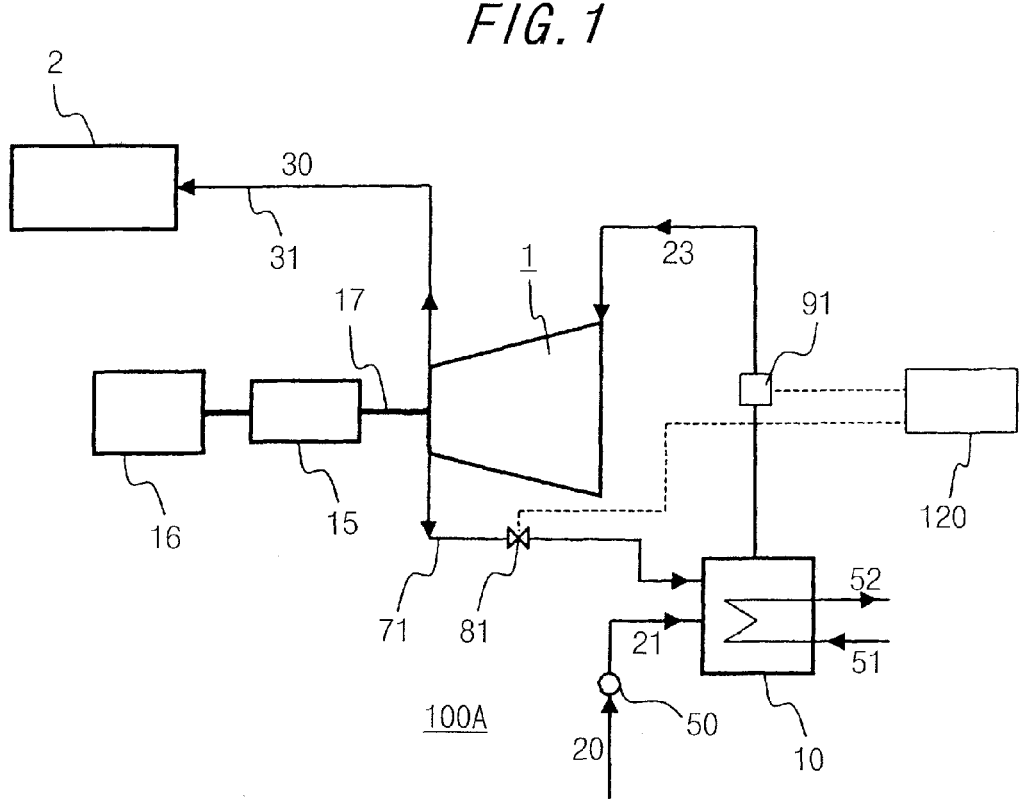
FIG. 1 is a system configuration diagram of a heat pump according to a first embodiment of the present invention.

Nowadays, a steam generator or boiler is predominantly used to supply steam to steam demanders such as paper factory and a garbage and sewage plant. The steam supplied to factories or the like has its clear usage in many cases, which requires installation of a boiler that has specifications meeting desired steam pressure and steam supply. A steam demander may request adjustable steam supply in some cases; therefore, it is desirable that a boiler be able to adjust the steam supply in the range of about ±20%.

A technique for controlling the pressure and flow of steam produced by a boiler is known as a technique for meeting such requirements. Examples of the control technique include a technique for controlling burning of a boiler for such control and a technique for controlling a feed pump for maintaining a boiler water level at a set value.

In recent years, in view of effective utilization of energy, it has been promoted to allow an exhaust heat recover system to effectively utilize exhaust heat from factories, electric booster stations, buildings and the like that was not effectively utilized so much until now. One of the exhaust heat recovery systems is a heat pump.

Under such background, the inventors have continued a study of effectiveness with respect to use of a heat pump when steam is supplied to a demander and acquired the following knowledge.

If a heat pump is used to supply steam to a steam demander, use of a system as below is advantageous in terms of energy efficiency. This system is provided with an evaporator that uses water as a working medium and exhaust heat as a heat source. The steam generated by the evaporator is increased in temperature and in pressure by a compressor. The high-temperature and high-pressure steam thus obtained is supplied to the demander. Use of water vapor as the working fluid of the compressor provides an advantage that a transferable energy amount per medium weight can dramatically be increased as compared with use of other working fluids.

However, use of such a system needs to deal with the following two problems: One of them is that the temperature of exhaust heat currently wasted without effective use is as low as about 80° C. or lower. The other is that the temperature of exhaust heat constantly fluctuates.

To deal with the first point, the inventors paid attention to the following: A heat pump configured to generate steam by allowing an evaporator to perform heat exchange between water and a heat source can effectively take in heat from even a heat source with lower temperature if the pressure of the working fluid is set at low pressure. In particular, if the pressure of the steam generated by the evaporator is set at negative pressure, exhaust heat with a temperature lower than 100° C. can effectively be utilized. Specifically, as described in the following embodiments, if the pressure of the steam generated by the evaporator is set at 0.014 MPa, even a 60° C.-exhaust heat can sufficiently effectively utilized as a heat source.

The second point is next described. Temperature fluctuations of exhaust heat which is a heat source lead to variations in the quantity, pressure and temperature of the steam generated by the evaporator. Incidentally, liquid is usually present in an evaporator during steady operation and the relative humidity in the evaporator is about 100% at all times. The pressure and temperature of the steam generated by the evaporator have the relationship in which if one of them is determined, the other is unambiguously determined. The compressor is set so as to enable optimum operation when working fluid has a certain given pressure and flow rate. Therefore, the variations in steam amount and in steam pressure degrade operability of the compressor. In addition, the variations in steam amount and in steam pressure increase a risk of surging occurrence, which deteriorates reliability of the compressor.

This problem is specific to the heat pump that uses exhaust heat as a heat source. The steam boiler described above is operated to supply steam, therefore, it is easy to exercise optimum control for the steam flow and steam pressure in supplying steam. On the other hand, if a heat pump is used, exhaust heat which is a heat source is not heat generated for steam supply but heat generated by another system. Since this heat is secondarily used, it is difficult to control the temperature of exhaust heat along with the operation of the heat pump.

The following embodiments describe configurations of the heat pump for solving the secondary problem described above and the function and effects thereof. The secondary problem is that in the steam supply system using the heat pump, temperature variations of the heat source deteriorate the reliability and operability of the compressor. A heat pump in which water is used as a working medium and the pressure of the steam generated by an evaporator is set at a negative pressure is detailed below.

(Explanation of a Heat Pump)

Figure 11:
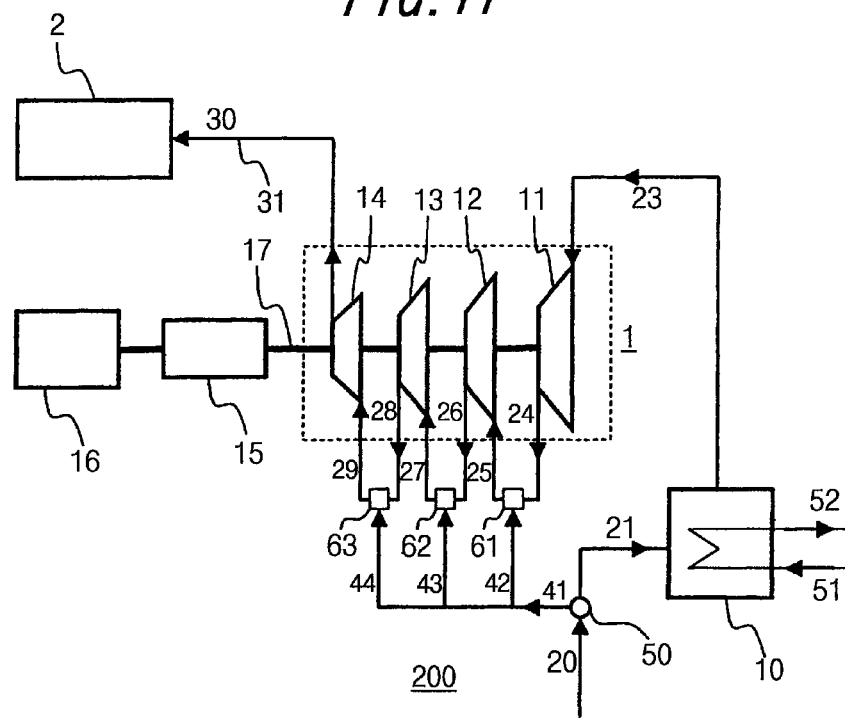
FIG. 11 is a system configuration diagram of a heat pump according to a conventional example.

A configuration of a heat pump is first described with reference to FIG. 11. FIG. 11 is a system configuration diagram of a heat pump which is a conventional example. The heat pump 200 of FIG. 11 is configured such that it includes an evaporator which uses exhaust heat as a heat source, vapor generated by the evaporator is increased in temperature and in pressure by a compressor, and the high-temperature and high-pressure vapor is supplied to a demander. Specifically, the heat pump includes the evaporator 10, a steam compressor 1 and an electric motor 16. The evaporator 10 generates a saturate vapor 23 through heat exchange between supply water 20 and exhaust heat 51 which is an external heat source. The compressor 1 compresses the saturated vapor 23 generated. The electric motor 16 is coaxially connected through a shaft 17 to the compressor 1 and to a gear 15 for driving the compressor 1. The compressor 1 in this example is a four-stage compressor composed of a first stage compressor 11, a second stage compressor 12, a third stage compressor 13 and a fourth stage compressor 14; however, the number of stages is not necessarily four as long as its specifications meet a predetermined pressure ratio. A plurality of compressors may be used instead of the multi-stage compressor 1.

In the compressor 1, a portion of the supply water 20 is supplied by the pump 50 to a humidification system 61 installed between the first stage compressor and the second stage compressor via a line 42, to a humidification system 62 installed between the second stage compressor and the third stage compressor via a line 43, and to a humidification system 63 installed between the third stage compressor and the fourth stage compressor via a line 44. Water vapor which is the working fluid of the steam compressor 1 is intermediate-cooled by the atomized water from each humidity system. In addition, if the number of stages of the steam compressor is different from that of this example, a humidity system is installed between adjacent stages to intermediate-cool vapor.

A description is made of flow of the working fluid in the heat pump. The supplied water 20 is supplied as liquid water 21 in a fluid state to the evaporator 10. The liquid water 21 is heated in the evaporator 10 by the exhaust heat 51 which is an external heat source such as factory exhaust heat or the like, and is increased in temperature to a saturated temperature. A portion of the liquid water 21 is evaporated into a vapor. The vapor generated by the heat exchange flows as a saturated vapor 23 in the first stage compressor 11 of the steam compressor 1. The saturated vapor 23 is increased in temperature and in pressure by the first stage compressor 11 to become a high-temperature and high-pressure superheated vapor 24. The superheated vapor 24 is humidified by the humidification system 61 installed between the first stage compressor 11 and the second stage compressor 12 to be cooled and led to the second stage compressor 12. The vapor thus led is compressed by the second stage compressor 12 to become a high-temperature and high-pressure superheated vapor 26, which is then humidified and cooled by the humidification system 62 installed between the second stage compressor 12 and the third stage compressor 13. This vapor 27 is increased in temperature and in pressure by the third stage compressor 13 to become a superheated vapor 28, which is humidified and cooled by the humidification system 63 installed between the third stage condenser 13 and the fourth stage condenser 14. This vapor 29 is further increased in temperature and in pressure by the fourth stage compressor 14 to become a superheated vapor 30, which is supplied through a steam supply duct 31 to a facility 2 such as factories that need vapor.

A description is next made of the specific operation of the heat pump paying attention to the state of the working fluid. The supply water 20 that is to flow in the heat pump 200 enters the evaporator 10 as about −15° C.-liquid water 21. The evaporation temperature of the evaporator 10 is set at 53° C. The liquid water 21 is heated by an about −60° C.-external high-temperature heat source 51 in the evaporator 10 to take evaporation latent heat therefrom and phase-changes from a liquid phase to a gas phase. The vapor generated in the evaporator 10 is led to the steam compressor 1 as the saturated vapor 23 having a saturated temperature of 53° C. and a saturated vapor pressure of 0.014 MPa. Mass flow of the saturated vapor 23 at this time is about 1.2 kg/s. The saturated vapor 23 is increased in pressure to a predetermined pressure ratio of about 2.4 by the first stage compressor 11 of the steam pressure 1 and becomes the superheated vapor 24 increased to a pressure of 0.034 MPa and to a temperature of about 160° C. at the outlet of the first stage compressor 11. The superheated vapor 24 is sprayed with water of about 0.05 kg/s by the humidification system 61 to lose evaporation latent heat, cooled to about 72° C. near saturated vapor temperature, and enters the second stage compressor 12 at a mass flow of 1.25 kg/s. The vapor that has flowed in the second stage compressor 12 is compressed to a predetermined pressure ratio of about 2.2 to become the superheated vapor 26 increased in pressure to 0.074 MPa and in temperature to about 180° C. The superheated vapor 26 is sprayed with water of about 0.06 kg/s, cooled to about 91° C. near the saturated steam temperature, and enters the third stage compressor 13 at a mass flow of 1.31 kg/s. This vapor is compressed in the third stage compressor 13 to a predetermined pressure ratio of about 2.0 to become the superheated vapor 28 increased in pressure to 0.15 MPa and in temperature to about 190° C. The superheated vapor 28 is sprayed with water of about 0.065 kg/s by the humidification system 63, cooled to about 110° C. near the saturated steam temperature, and enters the fourth stage compressor 14 at a mass flow of 1.38 kg/s. The vapor that entered the fourth stage compressor 14 is compressed to a predetermined pressure ratio of about 1.8 to become the superheated vapor 30 increased in pressure to 0.27 MPa and in temperature to about 200° C. This superheated vapor 30 is supplied as an industrial heat source via the vapor supply duct 31 to the facility 2 such as paper factories, food factories, chemical factories and other factories that utilize vapor.

Incidentally, the compressor is a machine that increases the pressure of the working fluid sucked therein, and a ratio of pressure before and after increased is called a pressure ratio. It is assumed that the pressure ratio of the steam compressor 1 in the present heat pump is about 19.

A system that generates vapor by means of a boiler in supplying the vapor to the facility 2 that needs vapor is such that most energy for generating vapor depends on thermal energy from fuel charged. In contrast, the system that uses the heat pump of each embodiment of the present invention can take in exhaust heat wastefully released and the innumerable thermal energy of ambient environment. Therefore, it is possible to dramatically increase energy efficiency. In addition, the intermediate cooling is performed in which the compressor working fluid is cooled between the adjacent stages of the compressor. Therefore, the compressor power can be reduced to increase the efficiency of the system.

A description is next made of an operational problem encountered when the heat pump is used for steam supply.

The exhaust heat 51 which is the heat source of the evaporator 10 has conventionally been wastefully released. The temperature and flow rate of such exhaust heat 51 are not usually constant, that is, fluctuate.

For example, about −15° C. water may be supplied and the exhaust heat 51 may be supplied as fluid to the evaporator 10 with an evaporation temperature of 53° C. and with a saturated steam pressure of 0.014 MPa. In this case, it is assumed that an amount of heat that is supplied from the exhaust heat into the system is reduced by 5% due to reductions in exhaust temperature and in flow rate of the exhaust heat. Incidentally, the reduction in the amount of heat corresponds to a reduction in exhaust heat supply flow rate by 5% when it is assumed that the exhaust heat supply temperature rate is constant. On the other hand, it corresponds to a reduction in exhaust heat supply temperature by about 0.5° C. when it is assumed that the exhaust heat supply flow rate is constant. In this case, the supply water 21 obtains energy through heat exchange with the exhaust heat 51 in the evaporator 10. A portion of the supply water becomes a saturated vapor at an evaporator temperature of 53° C. This saturated vapor has a pressure of 0.014 MPa and a temperature of 53° C. In this case, the flow rate of the vapor generated in the evaporator 10 reduces by about 5%. The reduction in the amount of vapor generated in the evaporator 10 reduces the flow rate of vapor flowing in the steam compressor 1. An inlet flow angle of the vapor flowing in the compressor deviates, the performance of the compressor degrades and a pressure ratio due to a reduction in suction flow rate increases. Thus, the surge margin of the compressor is likely to reduce. The surge margin refers to the margin between a pressure ratio causing a surging phenomenon and a pressure ratio of an actual operation point. The surging phenomenon refers to a phenomenon in which as the pressure ratio rises, pressure involving intense sound, intense flow pulsation and mechanical vibration abruptly occur at a point where the pressure ration is reached, which makes the operation of the compressor unstable.

A reduction in flow rate of the steam flowing in the steam compressor 1 increases the pressure ratio of the compressor. Since the pressure of the vapor flowing in the compressor has a constant saturated steam pressure, the increase in pressure ratio leads to increases in pressure and in temperature of superheated vapors 24, 26, 28 at the respective outlets of the compressors. The superheated vapors 24, 26 and 28 increased in temperature and pressure are sprayed with the planned amount of water by the humidification systems 61, 62 and 63, respectively. Since the temperature of the superheated vapor is too high, it is unlikely to provide sufficient intermediate cooling. If the sufficient intermediate cooling is not provided, the power of the compressor is increased, which leads to reduced efficiency of the system. In addition, the vapor at the outlet of the steam compressor increases in pressure and in temperature compared with the predetermined vapor conditions, which may not meet the requested vapor conditions.

As described above, the heat pump that uses an external heat source such as the exhaust heat 51 requires the following: The surge margin of the steam compressor 1 is ensured to enhance reliability with respect to the fluctuations in the amount of vapor generated in the evaporator 10 caused by the fluctuations of the heat energy supplied from the exhaust heat 51 during the rated operation. Degradation in the performance of the steam compressor 1 due to the fluctuations in the flow rate of vapor is suppressed. The vapor of the desired conditions is supplied to the facility 2. The heat pump of the present invention that meets the requirements mentioned above will hereinafter be described in detail through embodiments.

Embodiment 1

A first embodiment of the present invention is detailed with reference to FIG. 1, which is a system configuration diagram of a heat pump according to the first embodiment of the invention. For simplification, the heat pump 100A of the embodiment is such that a steam compressor 1 is a single stage compressor and intermediate cooling is not performed.

A description is made of a problem of variation in vapor flow rate of the heat pump due to the fluctuations of exhaust heat and of a method of solving the problem with reference to FIG. 1. Water 21 with a temperature of about 15° C. is heated by exhaust heat 51 in an evaporator 10 to generate a saturated vapor 23 with a temperature of 53° C. and with a pressure of 0.014 MPa. If the fluctuations of the exhaust heat which is a heat source reduce the amount of heat given to the water by the exhaust heat by 5%, however, the amount of vapor generated in the evaporator 10 is reduced by 5%. This saturated steam 23 flows in the steam compressor 1 and is compressed herein to become a saturated vapor 30. A portion of the saturated vapor 30 is led via a bleed duct 71 through the opening and closing of a valve 81 to the evaporator 10 by about 0.06 kg/s which corresponds to a difference between a rated flow and an actual flow and is mixed with the saturated vapor in the evaporator 10. The remainder of the superheated vapor 30 is supplied to the facility 2 that needs vapor.

The flow rate of the superheated vapor led from the bleed duct 71 to the evaporator 10 is controlled by a controller 120. The controller 120 determines the flow rate of the superheated vapor to be led from the bleed duct 71 to the evaporator 10 based on the data of the flow rate and pressure of the vapor from a measuring device 91 installed between the evaporator 10 and the steam compressor 1. The valve 81 is controlled to control the amount of superheated vapor to be led from the bleed duct 71 to the evaporator 10 so that the flow rate and pressure of the vapor may become respective desired values.

The present embodiment is configured as below. The pressure and flow rate of the saturated vapor 23 flowing in the steam compressor is measured and based on the measurement values, a portion of the superheated vapor 30 increased in pressure in the steam compressor 1 is led to the evaporator 10 by the control of the valve 81 and mixed with the saturated vapor 23. Thus, the inlet flow rate of the steam compressor 1 substantially becomes rated flow. This can suppress the reduction of the surge margin caused by increased pressure ratio due to reduction in the flow rate of the working fluid of the compressor. In addition, since the compressor can usually operate within the design point, also reduction in the efficiency of the steam compressor resulting from the fluctuations in flow rate, which can enhance the reliability of the operation of the heat pump.

Since the present embodiment includes means for adjusting an amount of vapor flowing in the compressor 1, the exhaust heat whose temperature always fluctuates can effectively be utilized. In addition, the present embodiment includes the bleed duct 71 which bleeds vapor from the compressor 1 or the vapor supply duct 31. Therefore, the amount of vapor to be generated by the evaporator 10 can be adjusted.

The present embodiment describes the function and effect of the heat pump including the measuring device 91, the bleed duct 71 and the valve 81. However, a heat pump provided with the measuring device 91 can easily be modified by additionally providing the bleed duct 71 and the valve 81 as in the present embodiment, thereby providing the same function and effects. It is preferred that a controller connected to the valve 81 and to the measuring device 91 be additionally provided or an existing controller be connected to the valve 81 and to the measuring device 91.

In the present embodiment, the measuring device 91 capable of detecting the flow rate and pressure of the saturated vapor 23 is installed between the steam compressor 1 and the evaporator 10. This is because of the following: Since the flow rate of the vapor flowing in the steam compressor 1 serves as an input signal used for controlling an angle of a variable stator vane equipped in the steam compressor and for controlling opening and closing of the valve 81 for bleed vapor, it is necessary to measure the flow rate of the vapor with as much accuracy as possible. It is conceivable that the amount of vapor is estimated from measurement of temperature of the exhaust heat 51 which is a heat source. In this case, it is necessary to calculate the amount of vapor flowing in the steam compressor 1 by adding thereto the superheated vapor bled from the steam compressor 1 and led to the evaporator 10 via the duct 71. In view of measurement accuracy, therefore, it is preferable that the amount of vapor flowing in the steam compressor 1 be directly measured by a measuring device installed between the steam compressor 1 and the evaporator 10. It is more desirable to install the measuring device 91 outside than inside the evaporator 10 in order to eliminate the estimations of the amount of bled vapor and mixture loss of the bled vapor. Taking into account the pressure loss of a duct and the like, it is more desirable to install the measuring device as closer as possible to the steam compressor 1 than to the evaporator 10. Problems to be considered when the measuring device 91 is installed are not only detection accuracy but also, e.g., installation space and easiness of installation. Therefore, the installation site of the measuring device 91 is not limited to a site between the steam compressor 1 and the evaporator 10. Any place may be allowable as long as the flow rate of the vapor 23 can be measured directly or indirectly through calculation.

Embodiment 2

Figure 2:
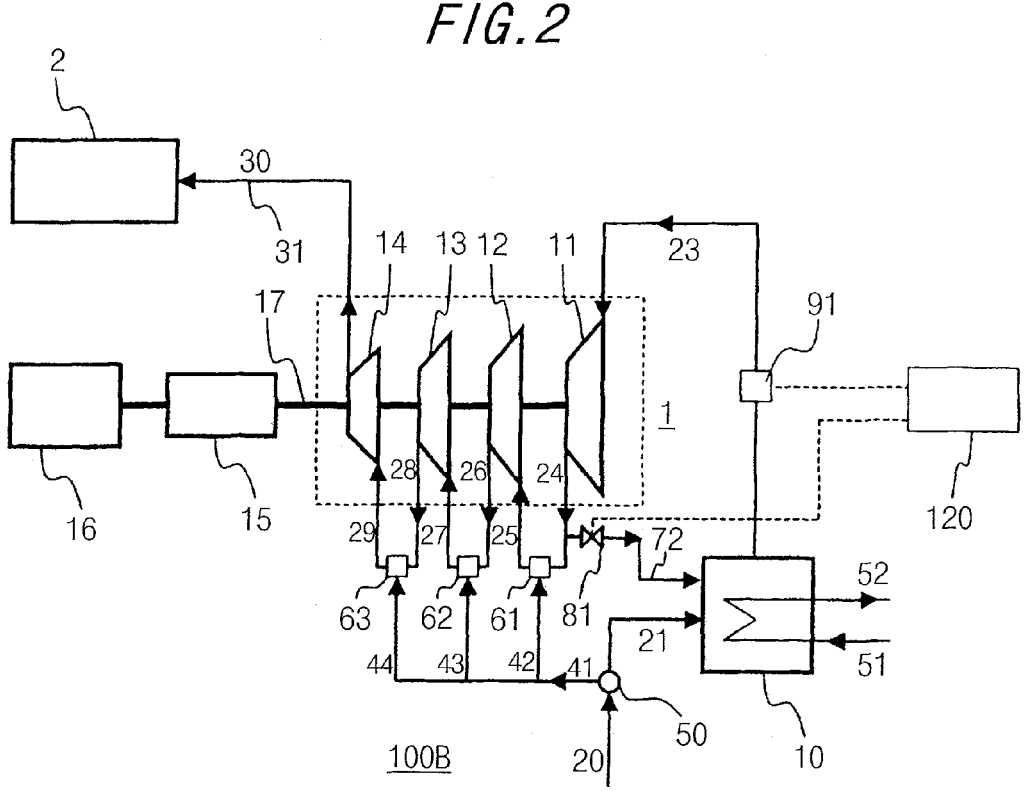
FIG. 2 is a system configuration diagram of a heat pump according to a second embodiment of the present invention.

A second embodiment of the present invention is described with reference to FIG. 2, which is a system configuration diagram of a heat pump according to the second embodiment of the present invention. A steam compressor 1 is of a four-stage configuration in which a mainstream vapor is intermediate-cooled by humidification systems 61, 62, 63 each provided between adjacent stages. A portion of a superheated vapor 24 at an outlet of a first stage compressor 11 is led to an evaporator 10 through a bleed duct 72.

In the heat pump of the embodiment, when a measuring device 91 detects the flow rate and pressure of the saturated vapor 23 generated by the evaporator 10, if the saturated vapor 23 may not meet rated flow, a controller 120 controls a valve 81 based on the data from the measuring device so that a portion of the superheated vapor 24 increased in pressure in the first stage 11 may be led from a bleed duct 72 to the evaporator 10. The remainder of the superheated vapor 24 is intermediate-cooled with water-spray by the humidification system 61 and flows in the second stage 12. With such a configuration, a reduction in the amount of vapor flowing in the first stage compressor 11 can be suppressed, whereby the reduction of the surge margin of the first stage compressor 11 can be suppressed. However, since the portion of the superheated vapor 24 is led to the evaporator 10, the flow rate of vapor flowing in the second stage compressor 12 is reduced to a level lower than rated flow. The reduction in the flow rate of the vapor led to the second stage compressor raises pressure ratios of the second stage compressor 12 and of the subsequent stage compressors, which may probably reduce the surge margin.

Embodiment 3

A third embodiment of the present invention is described with reference to FIG. 3. This embodiment is different from the second embodiment in that a bleed duct 73 communicating with an evaporator 10 from an outlet of a fourth stage compressor 14 which is a final stage compressor is provided as a system that extracts vapor from the steam compressor 1 to the evaporator 10. The embodiment is the same as the second embodiment in the other points such as a point in which a controller 120 controls a valve 82 on the basis of data from a measuring device 91.

Figure 3:
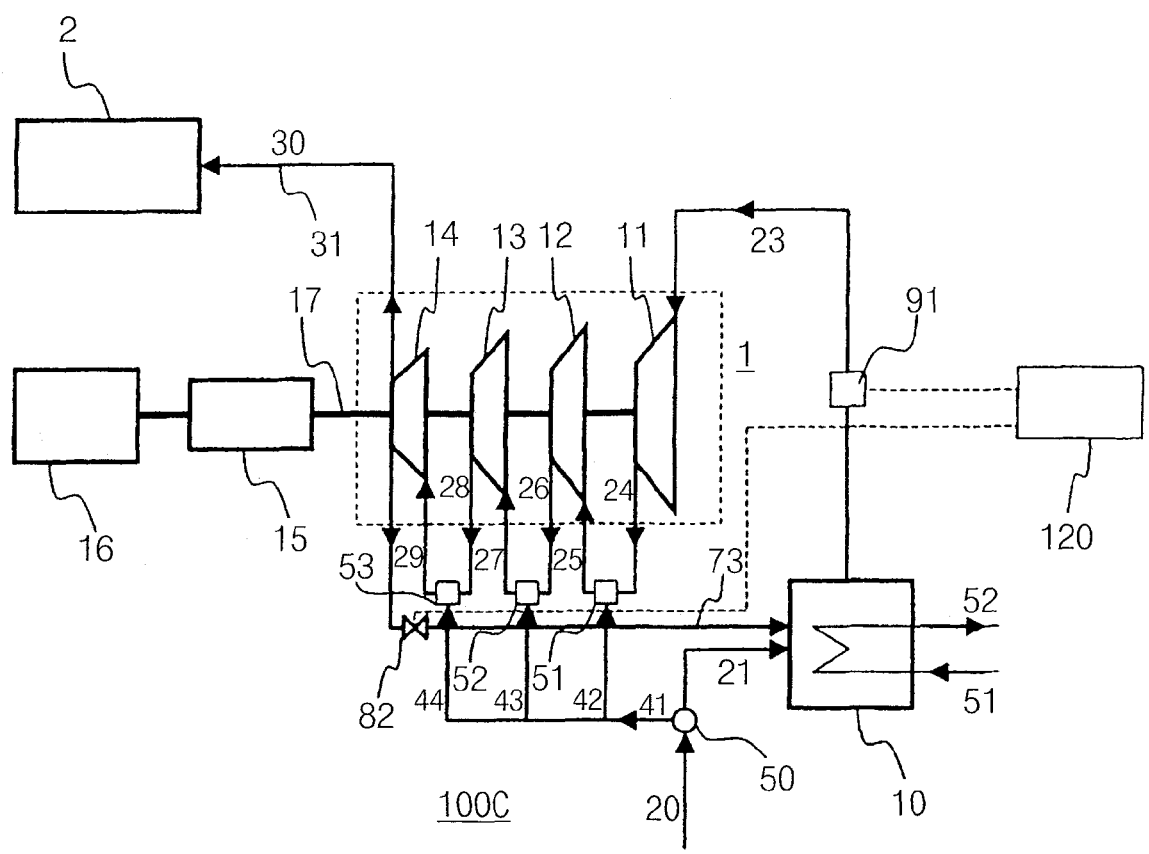
FIG. 3 is a system configuration diagram of a heat pump according to a third embodiment of the present invention.

As shown in FIG. 3, the present embodiment has a system that leads a portion of the superheated vapor 30 flowing out from the outlet of the fourth stage compressor 14 which is the final stage compressor, to the evaporator 10 via a bleed duct 73. This makes it possible that the flow rate of the full stages of the steam compressor 1 is made substantially equal to a planned value. Thus, the surge margin can be ensured over the full stages of the steam compressor 1. The present embodiment describes the steam compressor 1 which is configured as a four-stage compressor including first through four stage compressors. A steam compressor composed of a plurality of stages is configured such that a portion of superheated vapor is bled from the outlet of the final stage compressor and led to the evaporator 10. This makes it possible to operate the steam compressor with a high degree of reliability. Incidentally, the usual steam boiler is operated with the pressure of vapor to be supplied made constant. The heat pump of the present embodiment can maintain the pressure of vapor to be supplied at a predetermined pressure, therefore, it is possible to introduce the heat pump as the substitute for a steam boiler.

Figure 4:
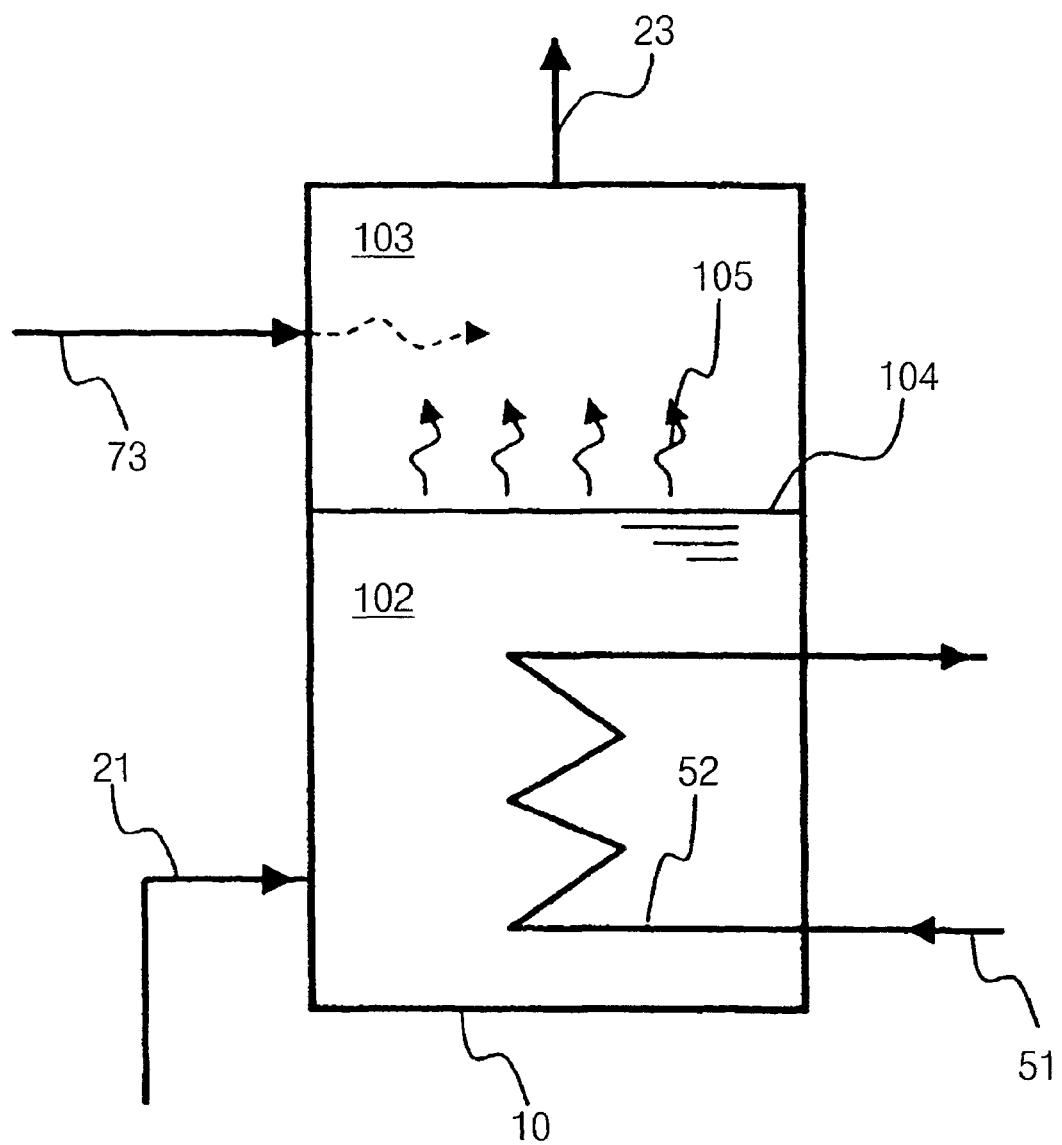
FIG. 4 is a configuration diagram of an evaporator included in the heat pump according to the third embodiment.

FIG. 4 is an enlarged view of the evaporator 10 of the present embodiment. A description is made of how to introduce a bleed vapor from the steam compressor 1 through the bleed duct to the evaporator 10 with reference to FIG. 4.

The water in the evaporator 10 is divided into a liquid phase 102 and a gas phase 103. The water 21 is fed to the liquid phase 102. A pipe line 52 adapted to obtain heat energy from the exhaust heat 51 through heat exchange is arranged in the liquid phase 102 so as to provide heat energy to the liquid phase 102. The bleed duct 73 adapted to introduce bleed vapor from the steam compressor is installed in the gas phase 103.

About 15° C. water is supplied to the liquid phase 102 of the evaporator 10 kept at about 0.014 MPa which is saturated vapor pressure and heated by the exhaust heat 51 to boil at an evaporation temperature of 53° C. The water changed into gas evaporates as a saturated vapor 105. If the amount of heat supplied from the exhaust heat 51 is reduced, the flow rate of the vapor generated in the evaporator 10 is reduced. To compensate for the reduction, a superheated vapor is led from the discharge side of the steam compressor through the bleed duct 73 to the evaporator 10. The mixed vapor 23 of the superheated vapor and saturated vapor 105 flows in the steam compressor 1.

Incidentally, it is preferred that the superheated vapor led to the evaporator through the bleed duct 73 be led to the gas phase 103. If the superheated vapor is supplied to the liquid phase 102, it is condensed in the liquid phase 102 so that condensation latent heat is used as energy to raise the temperature of the liquid phase 102. The energy of the bleed vapor is in minute amount relative to the heat energy of the exhaust heat so that the amount of vapor flowing into the steam compressor is not changed as such. Thus, it is difficult to achieve the primary object of compensating for the reduction in the flow rate of the vapor 23 by increasing the amount of vapor. In the case where the superheated vapor is supplied to the path between the outlet of the evaporator 10 and the steam compressor 1, if a bleed vapor is simply led to the middle of the duct, the temperature and velocity are likely to be nonuniform in the duct, causing a pressure loss. To uniformly mix the bleed vapor with the saturated vapor, it is necessary to additionally install a device for promoting the mix in the vicinity of the introducing portion, which makes the system complicate to increase cost.

The evaporator 10 of the present embodiment is configured to supply a bleed vapor to the gas phase 103. This allows the superheated vapor supplied via the bleed duct 73 to sufficiently mix with the saturated vapor 105. Consequently, the mixed vapor 23 having relatively uniform temperature can be allowed to flow in the steam compressor 1.

Embodiment 4

A fourth embodiment of the present invention is described with reference to FIGS. 5, 6A, 6B, 7A and 7B. Unlike the above embodiments, the present embodiment adopts a technology in which an inlet guide vane is controlled to deal with variations in vapor production in an evaporator 10 due to exhaust heat fluctuations.

Figure 5:
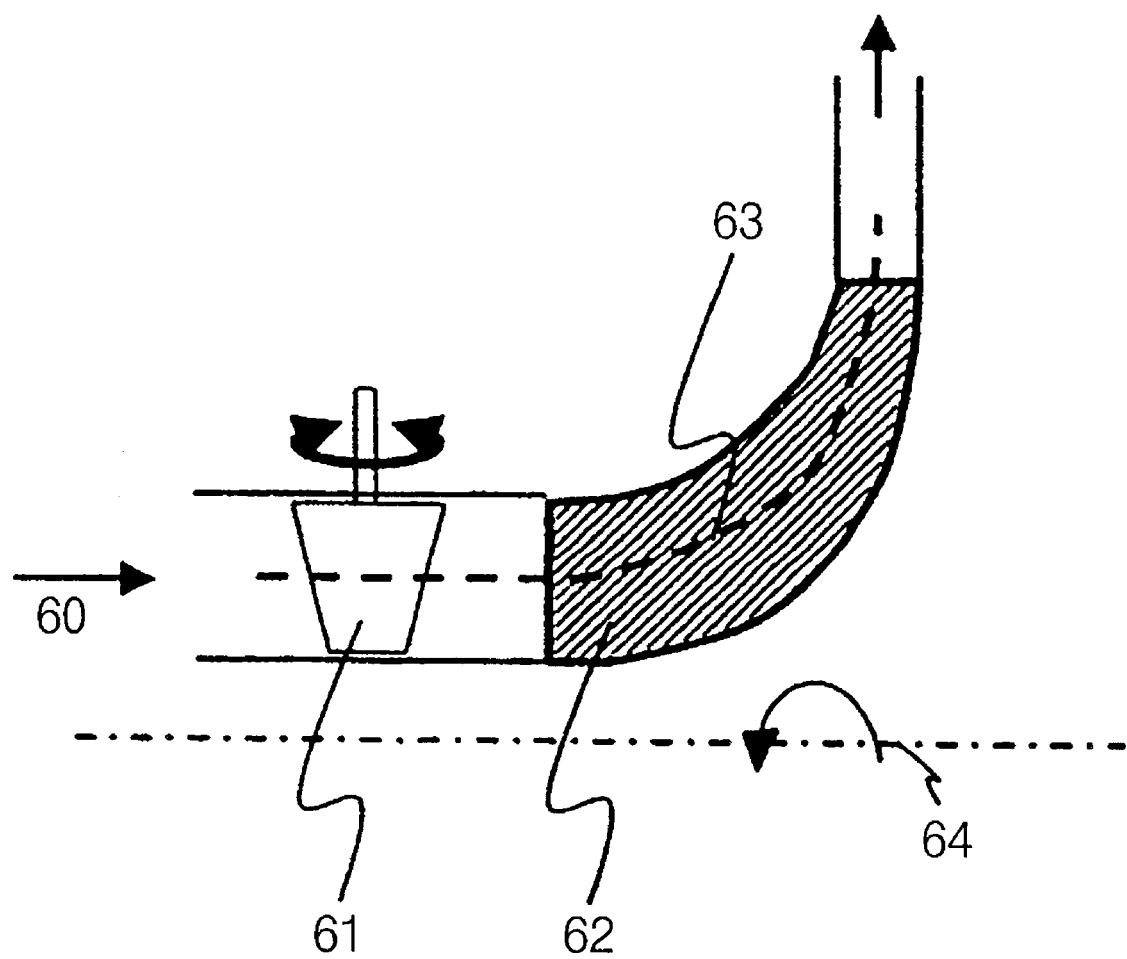
FIG. 5 is a partially enlarged view of a compressor of a heat pump according to a fourth embodiment of the present invention.

FIG. 5 is an enlarged view of a first stage compressor 11 of a steam compressor according to the present embodiment. Referring to FIG. 5, the first stage compressor 11 is configured to include a rotary axis 64 and to allow vapor 60 which is working fluid to flow in from the left side in the figure and flows out upward. As described above, since the heat pump of the present embodiment uses exhaust heat 51 as a heat source, the flow rate of the vapor 60 flowing in the steam compressor 1 varies due to fluctuations of the exhaust heat 51. The present embodiment includes an inlet guide vane 61 installed on the upstream side of a centrifugal compressor impeller 62 in order to meet the performance of the steam compressor in spite of the variations in vapor amount. The inlet guide vane 61 is turnably installed. In response to the flow rate of vapor detected on the downstream side of the evaporator 10, the inlet guide vane 61 is turned to open or close the inlet path of the compressor for controlling the amount of vapor flowing in the steam compressor 1. In general, also an air compressor used in a gas turbine is provided with an inlet guide vane. During the rated operation of the gas turbine, the mass flow of air which is working fluid of the compressor is substantially constant. Thus, the inlet guide vane is hardly controlled at all during the rated operation. The reason for use of the inlet guide vane is to ensure the performance and surge margin of the compressor by following the variations in flow rate encountered when the gas turbine is started. Since the exhaust heat fluctuates even during the rated operation of the steam compressor 1 in the present embodiment, the flow rate of vapor flowing in the compressor is constantly detected by a measuring device 91 and the inlet path is opened or closed in response to the flow rate.

Figure 6A:
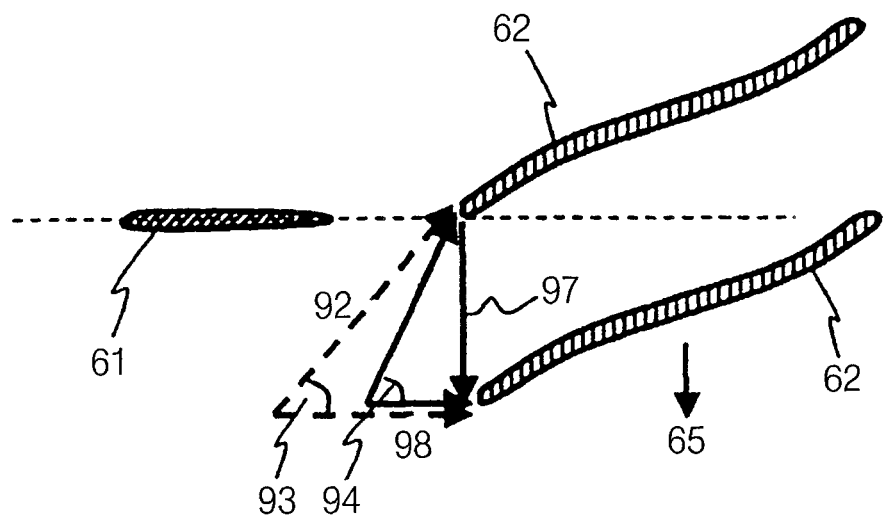
FIGS. 6A and 6B are partially enlarged views of the compressor of the fourth embodiment.
Figure 6B:
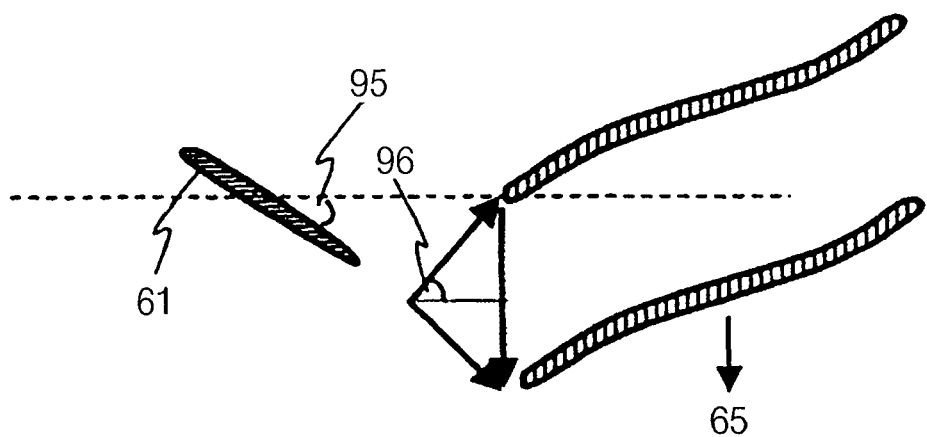

A description is next made of how the opening-closing of the inlet path influences the flow of the working fluid to the compressor impeller 62 with reference to FIGS. 6A and 6B. FIGS. 6A and 6B illustrate a cross-sectional shape of the blade taken along the dashed line 63 of FIG. 5. The impeller 62 rotates in the direction of arrow 65 at circumferential velocity 97. The working fluid 60 flows in the compressor impeller 62 in parallel to the axial direction. The inlet guide vane 61 is also installed parallel to the axial direction as shown in FIG. 6A. It is assumed that the inlet guide vane 61 has a stagger angle of 0° in this case. If the stagger angle of the inlet guide vane 61 is 0°, a triangle formed by velocity 98 (absolute velocity), as view from an absolute field, of the working fluid flowing out from the inlet guide vane and velocity 92 (relative velocity), as viewed from the rotation field of the impeller), of the working fluid flowing in the impeller 62 is called a velocity triangle. Incidentally, an angle 93 formed between the absolute velocity and the relative velocity corresponds to the inlet flow angle of the impeller.

In a state where the stagger angle of the inlet guide vane 61 is 0°, if the flow rate of vapor flowing in the compressor reduces due to the exhaust heat fluctuations to reduce the absolute velocity, the inlet flow angle 94 of the vapor flowing in the impeller 62 increases. This deviation in the inlet flow angle relative to the impeller 62 causes the higher pressure loss of the impeller blade and the performance degradation of the compressor. If the stagger angle 95 of the inlet guide vane 61 is increased as shown in FIG. 6B, the vapor is turned at the outlet of the inlet guide vane 61. Thus, the inlet flow angle 96 of the vapor flowing in the impeller can be set substantially equally to the inlet flow angle 93 for the rated flow. As a result, the reduction in the higher pressure loss of the impeller blade 62 and the degradation in the performance of the compressor can be suppressed. If the inflow Mach number of the compressor impeller 62 is almost equal to as high as supersonic, the stagger angle 95 of the inlet guide vane 61 is increased to form a turning angle at an impeller inlet. Thus, a high Mach number shock loss can be reduced to improve compressor efficiency.

Figure 7A:
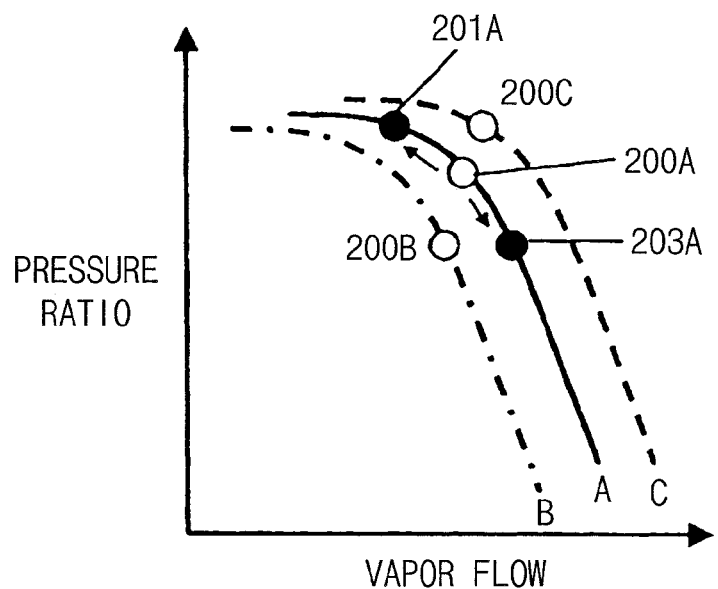
FIGS. 7A and 7B indicate a pressure ratio vs. steam flow and efficiency vs. pressure ratio of the compressor included in the heat pump according to the fourth embodiment.
Figure 7B:
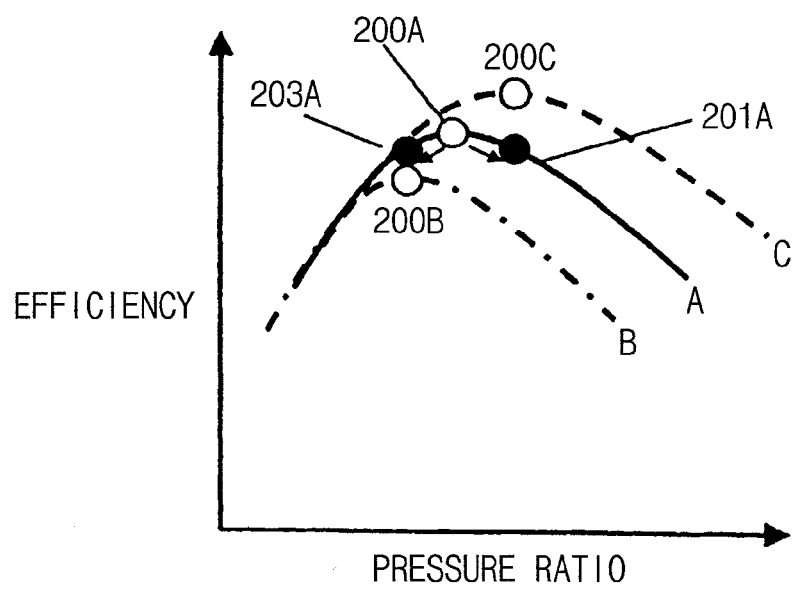

The effect of the inlet guide vane 61 is described with reference to FIG. 7. FIG. 7A indicates a pressure ratio relative to the vapor flow of the steam compressor 1 and FIG. 7B indicates efficiency relative to the pressure ratio. Curves A, B and C in FIGS. 7A and 7B indicate respective characteristics of the steam compressor 1 for a certain vapor flow. Characteristic A indicates the characteristic of the steam compressor 1 encountered when a vapor amount is the rated flow. Point 200A on the characteristic A indicates a rated flow, a rated pressure ratio and rated efficiency. If exhaust heat fluctuations reduce vapor flow, an operation point moves from 200A to 201A, in which the pressure ratio rises and the efficiency is down. In this case, the inlet guide vane 61 is turned to widen the inlet path, which changes the characteristic of the compressor 1 from characteristic A to characteristic C and the operation point moves from 201A to 200C. The operation pressure ratio is substantially constant; therefore, the optimum efficiency for the characteristic of the compressor 1 can be provided while increasing the flow rate of vapor flowing in the compressor 1. Similarly, if exhaust heat fluctuations increase vapor flow, an operation point moves from 200A to 203A, in which the pressure ratio is down and the efficiency is down. In this case, the inlet guide vane 61 is turned to narrow the inlet path, which changes the characteristic of the compressor 1 from characteristic A to characteristic B and the operation point moves from 203A to 200B. The operation pressure ratio is substantially constant, therefore, the optimum efficiency for the characteristic of the compressor 1 can be provided while reducing the flow rate of vapor flowing in the compressor 1.

The steam compressor 1 of the present embodiment needs to consider both the increased and decreased flow rates of vapor due to exhaust heat fluctuations. If an impeller is designed at a design point where the inlet guide vane is disposed at the inlet of the compressor, it is desirable, therefore, to design the impeller in a state where the stagger angle of the inlet guide vane 61 is not 0°. That is to say, the stagger angle of the inlet guide vane is set so that the vapor flow may not be maximized during the steady operation. Even if the vapor amount generated in the evaporator 10 is reduced due to the exhaust heat fluctuations or the like, the amount of vapor flowing in the steam compressor is increased by controlling the inlet guide vane 61. Thus, a heat pump is provided that can stably supply steam to the facility 2.

Incidentally, the heat pump provided with the inlet guide vane disposed at the inlet of the steam compressor according to the present embodiment may be equipped with the bleed structure described above in which the superheated vapor of the steam compressor is supplied to the evaporator. With this configuration, the higher reliable system can be operated that deals with the fluctuations of the exhaust heat which is a heat source.

Embodiment 5

Figure 8:
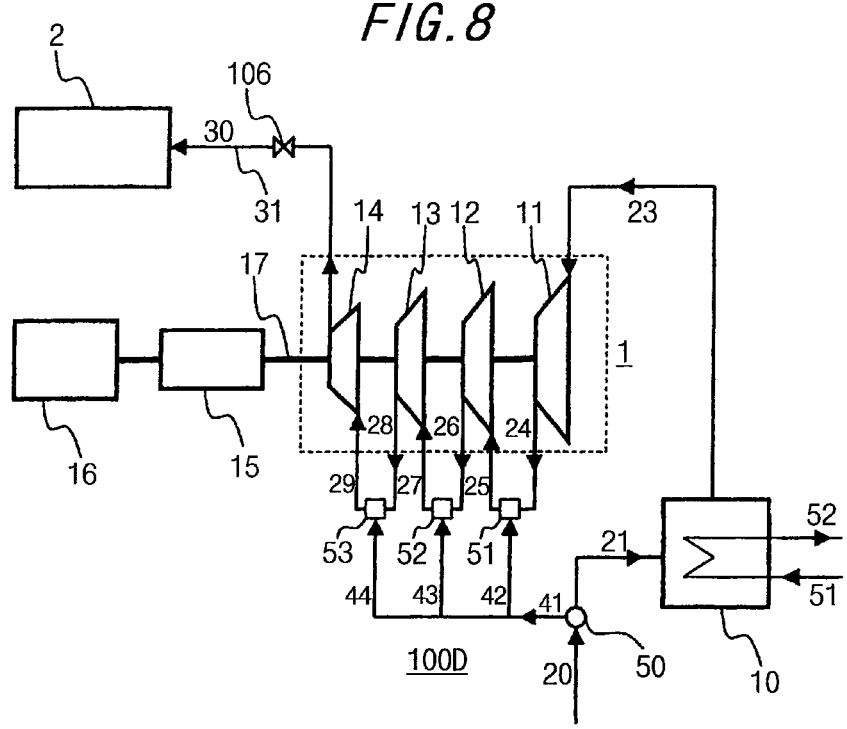
FIG. 8 is a system configuration diagram of a heat pump according to a fifth embodiment of the present invention.

A fifth embodiment of the present invention is described with reference to FIG. 8. FIG. 8 is a configuration diagram illustrating a heat pump according to the fifth embodiment. It is to be noted that like reference numerals designate the same or corresponding parts as those shown in FIGS. 1 to 3 and 10 and detailed explanation is omitted. The heat pump of the present embodiment is different from that shown in FIG. 11 in that a throttle valve 106 is provided in a line adapted to supply the superheated vapor 30 flowing out from the fourth stage compressor 14 of the steam compressor 1 to the facility 2.

A feature of the heat pump according to the present embodiment is described with reference to FIG. 8. If an amount of vapor flowing in the steam compressor 1 is reduced due to exhaust heat fluctuations for example, a pressure ratio is increased in the compressor as shown in FIG. 7A. The saturated vapor pressure of the evaporator 10 is constant, that is, not changed by the exhaust heat fluctuations. The first stage compressor 11 has an inlet pressure of 0.014 MPa. The pressure ratio at the inlet is constant and the pressure ratios of the compressor stages are increased so that pressure at the compressor outlet is raised. The reduction in flow rate at each stage increases the pressure ratio so that the discharge pressure at the fourth stage compressor 14 becomes a level higher than a planned value. In contrast, the pressure of vapor the facility 2 need is constant.

Since the present embodiment includes the throttle valve 106, the pressure of vapor supplied to the facility 2 can be kept constant, thereby achieving stable supply of a superheated vapor. Incidentally, also the heat pump of the present embodiment can concurrently be provided with the above-described bleed structure or the inlet guide vane.

Embodiment 6

Figure 9:
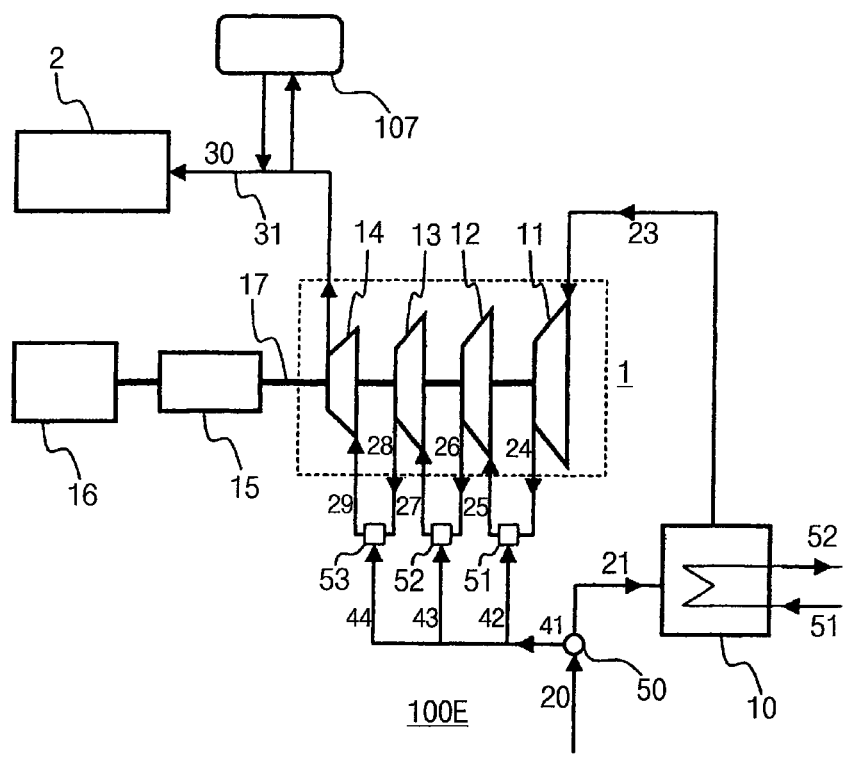
FIG. 9 is a system configuration diagram of a heat pump according to a sixth embodiment of the present invention.

A sixth embodiment of the present invention is described with reference to FIG. 9. FIG. 9 is a configuration diagram illustrating a heat pump according to the sixth embodiment. It is to be noted that like reference numerals designate the same or corresponding parts as those shown in FIGS. 1 to 3 and 10 and detailed explanation is omitted. This embodiment is different from that shown in FIG. 11 in that an accumulator 107 serving as a storage tank is disposed in the middle of the line adapted to supply to the facility 2 a superheated vapor 30 flowing out from a fourth stage compressor 14 of the steam compressor 1.

The accumulator 107 is generally used in boiler installations to store excess steam from a boiler during load fluctuations and it is used for a sudden lack of steam. Similarly to this concept, also the heat pump of the present invention can use the vapor stored in the accumulator 107 for reduction in vapor flow due to fluctuations of exhaust heat. In addition, the accumulator 107 is used to suppress variations in pressure of the vapor supplied to the facility 2. Also the heat pump of the present embodiment can concurrently be equipped with the above-described bleed structure or the inlet guide vane.

Embodiment 7

Figure 10:
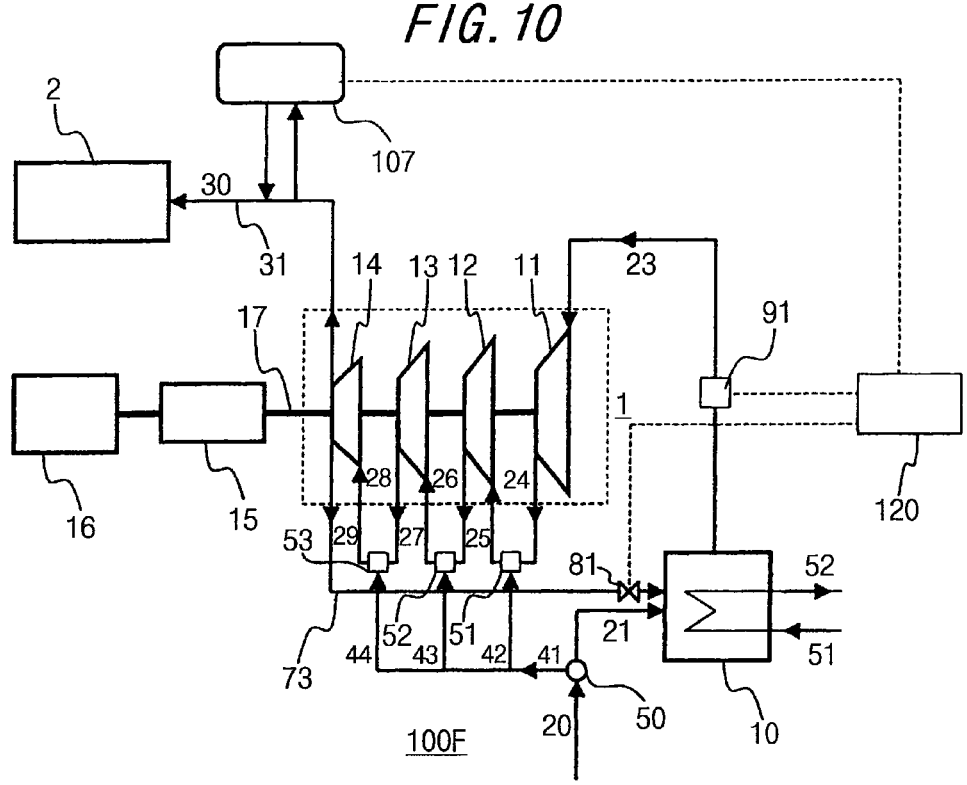
FIG. 10 is a system configuration diagram of a heat pump according to a seventh embodiment of the present invention.

If the heat pump of the sixth embodiment is concurrently equipped with the bleed structure described earlier, it particularly produces a significant effect. A description is made of a seventh embodiment in which the accumulator 107 of the sixth embodiment is installed in the heat pump of the third embodiment shown in FIG. 3. FIG. 10 is a configurational diagram illustrating the heat pump of the present embodiment.

If the amount of vapor generated by the evaporator 10 is reduced due to fluctuations of the exhaust heat 51, the controller 120 exercises control based on vapor flow information from the measuring device 91 so that the bleed valve 81 is opened to lead a portion of the superheated vapor 30 to the evaporator through the bleed duct 73. In addition, the controller 120 exercises control so that vapor is supplied from the accumulator 107 so as to compensate for the reduction of vapor resulting from the bleeding of the superheated vapor 30 supplied to the facility 2. The heat pump of the present embodiment is configured in this way to use the vapor stored in the accumulator 107 to compensate for the reduction of the amount of vapor supplied to the facility 2 resulting from the bleeding of vapor. Thus, the heat pump of the present embodiment can stably supply a desired amount and pressure of vapor to the facility 2 that requires vapor.

What is claimed is:
1. A heat pump comprising:
an evaporator evaporating water through heat exchange with exhaust heat;
a multistage compressor compressing the vapor generated by said evaporator, said multistage compressor including an inlet guide vane disposed only at an inlet of a first stage in said multistage compressor;

a vapor supply duct adapted to supply the vapor compressed by said multistage compressor to a steam-utilizing facility;

measuring means for measuring a state of vapor between said evaporator and said multistage compressor;

a controller controlling said inlet guide vane based on a flow rate of vapor flowing in said multistage compressor detected by said measuring means; and a humidification system disposed between adjacent stages in said multistage compressor and that sprays water between said adjacent stages in said multistage compressor.

2. The heat pump according to claim 1, further comprising means for adjusting pressure and a flow rate of vapor after the compression by said multistage compressor and before the supply to said steam-utilizing facility.

3. The heat pump according to claim 1, further comprising a storage tank storing vapor after the compression by said multistage compressor and before the supply to said steam-utilizing facility.

4. The heat pump according to claim 1, further including:

a bleed duct adapted to bleed vapor from said multistage compressor or from said vapor supply duct and lead the vapor to said evaporator and the measuring means is installed between the evaporator and the multistage compressor, wherein the controller controls a flow rate of the vapor to be led from the bleed duct to the evaporator to achieve predetermined flow rate and pressure data of the vapor as determined by the measuring means.

5. A method of controlling a heat pump in which water is evaporated in an evaporator through heat exchange with exhaust heat to generate vapor, the vapor generated is increased in temperature and in pressure by a multistage compressor and the vapor increased in temperature and in pressure is supplied to a steam-utilizing facility, the method comprising the steps of:

measuring a state of vapor between said evaporator and said multistage compressor;

controlling an inlet guide vane disposed only at an inlet of said multistage compressor based on a flow rate of vapor flowing in said multistage compressor obtained in said measuring step; and controlling a water spray by a humidification system disposed between adjacent stages in said multistage compressor.

* * * * *